No. 694,670. Patented Mar. 4, 1902.
G. H. SCHIEK.
DETACHABLE SPRING HINGE.
(Application filed Oct. 14, 1901.)
(No Model.)
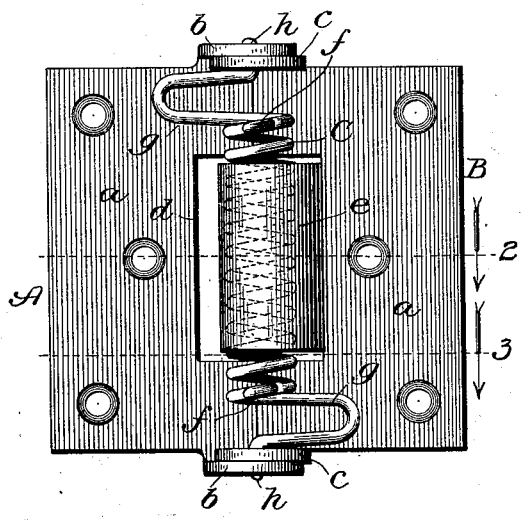
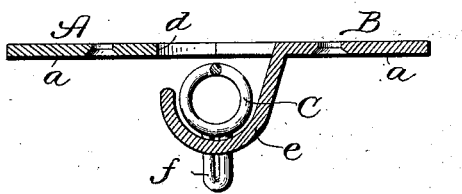
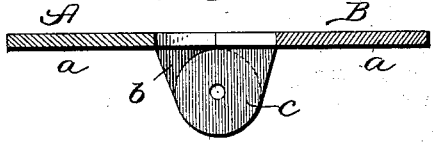
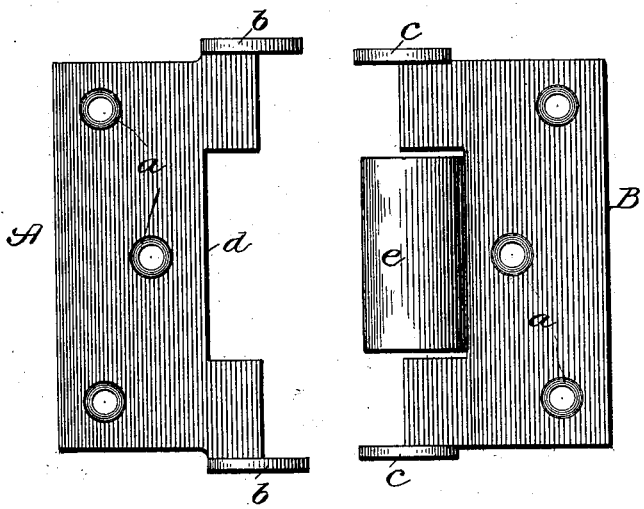
Witnesses:
John Enders Jr.
Geo. L. Davison.
Inventor:
George H. Schiek,
By Dyrenforth, Dyrenforth & Lee,
Attys.

UNITED STATES PATENT OFFICE.

GEORGE H. SCHIEK, OF JOLIET, ILLINOIS.

DETACHABLE SPRING-HINGE.

SPECIFICATION forming part of Letters Patent No. 694,670, dated March 4, 1902.

Application filed October 14, 1901. Serial No. 78,557. (No model.)

*To all whom it may concern:*

Be it known that I, GEORGE H. SCHIEK, a citizen of the United States, residing at Joliet, in the county of Will and State of Illinois, have invented a new and useful Improvement in Detachable Spring-Hinges, of which the following is a specification.

My invention relates to improvements in spring-hinges for use upon screen-doors or the like, where it is desired to render the hinge detachable.

My object is to provide a detachable spring-hinge of a construction which will render its leaves readily separable; and it is further my object to provide such a hinge of a particularly simple, durable, and inexpensive construction.

In the drawings, Figure 1 is a plan view of my improved detachable spring-hinge; Figs. 2 and 3, sections on lines 2 and 3 in Fig. 1, and Fig. 4 a plan view of the hinge members or leaves separated from each other.

A B are the leaves of the hinge, each provided with the usual screw-holes $a$. On the end of the leaf A are flanged and projecting ears $b\ b$ to embrace similar flanged and projecting ears $c$ on the leaf B. The ears are provided with perforations to register with each other when the leaves are fitted together. The leaf A is provided in its edge with a recess $d$. The leaf B is formed with a projecting arched housing part $e$.

C is a coiled spring, having bent offsets $f\ g$ and straight ends $h\ h$. When passed at its ends through the perforated ears of the leaves, the spring also operates as the pintle to hold the leaves together in pivotal relation. The offsets $g\ g$ bear, respectively, against the opposite leaves and tend to hold them open. The offsets $f$ present projections by means of which the spring may be readily contracted in length to enable it to be passed into or removed from operative position. The part $e$ operates as a housing for the spring and prevents its buckling in use.

To fasten the leaves together, it is only necessary to grasp the spring at the offsets $f$, contract it, and then allow it to expand when the leaves are brought together to pass through the perforated ears. To separate the leaves, the spring is contracted in the same way. The spring need not be removed from the leaf B.

It will be seen that my improved detachable spring-hinge is formed of but three members—the two leaves and the spring—making a construction that is particularly simple and inexpensive, as well as durable and effective, for its purpose.

What I claim as new, and desire to secure by Letters Patent, is—

1. In a detachable spring-hinge, the combination of companion leaves formed at their ends with perforated, overlapping ears, and a coiled spring having an offset toward each end bearing against the respective leaves, and ends passing through the said perforated ears, the spring being longitudinally contractible whereby it may be readily placed in and removed from its position and operates as the pintle for securing the leaves pivotally together.

2. In a detachable spring-hinge, the combination of companion leaves formed at their ends with perforated, overlapping ears, and a coiled spring having an offset toward each end bearing against the respective leaves, an offset $f$, and ends passing through the perforated ears, the spring being longitudinally contractible whereby it may be readily placed in and removed from its position, and operates as the pintle for securing the leaves pivotally together.

GEORGE H. SCHIEK.

In presence of—
ALBERT D. BACCI,
WM. B. DAVIES.